(12) United States Patent
Potter et al.

(10) Patent No.: US 10,186,857 B2
(45) Date of Patent: Jan. 22, 2019

(54) PARALLELING MECHANICAL RELAYS FOR INCREASED CURRENT CARRYING AND SWITCHING CAPACITY

(71) Applicant: Astronics Advanced Electronic Systems Corp., Kirkland, WA (US)

(72) Inventors: Frederick J. Potter, Trumbauersville, PA (US); Massoud Vaziri, Redmond, WA (US); Patrick Wellington Mills, Bradenton, FL (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 314 days.

(21) Appl. No.: 15/155,795

(22) Filed: May 16, 2016

(65) Prior Publication Data

US 2017/0331283 A1    Nov. 16, 2017

(51) Int. Cl.
*H02H 9/00*  (2006.01)
*H02H 9/02*  (2006.01)

(52) U.S. Cl.
CPC ..................... *H02H 9/02* (2013.01)

(58) Field of Classification Search
CPC ........................................................ H02H 9/02
See application file for complete search history.

(56) References Cited

U.S. PATENT DOCUMENTS

| | | | |
|---|---|---|---|
| 3,321,668 A | 5/1967 | Baker | |
| 3,555,353 A | 1/1971 | Casson et al. | |
| 3,639,808 A | 2/1972 | Ritzow | |
| 5,107,391 A | 4/1992 | Siepmann et al. | |
| 5,309,068 A * | 5/1994 | Hakkarainen | H05B 41/36 315/226 |
| 5,536,980 A | 7/1996 | Kawate | |
| 5,552,954 A | 9/1996 | Glehr | |
| 5,633,540 A * | 5/1997 | Moan | H01H 9/542 307/125 |
| 5,699,218 A * | 12/1997 | Kadah | H01H 9/542 361/13 |
| 5,790,354 A | 8/1998 | Altiti et al. | |
| 5,933,304 A * | 8/1999 | Irissou | H01H 9/542 361/13 |
| 7,079,363 B2 | 7/2006 | Chung | |
| 7,339,288 B2 | 3/2008 | Schasfoort | |

(Continued)

FOREIGN PATENT DOCUMENTS

EP   0 637 401 B1   2/1995
WO   2014/206306 A1   12/2014

OTHER PUBLICATIONS

Patent Cooperation Treaty, International Search Report, International Patent Application PCT/US17/30744.

*Primary Examiner* — Stephen W Jackson
(74) *Attorney, Agent, or Firm* — Wiggin and Dana LLP; Gregory S. Rosenblatt; Jonathan D. Hall

(57) ABSTRACT

Multiple relays are connected in parallel by including one or more semiconductor devices connected across the relay contacts. The semiconductor devices are triggered to conduct and shunt transient currents during the opening and closing of the relay contacts to protect the relay contacts from overcurrent and to eliminate arcing during relay switching. This permits a combination of smaller relays to replace a larger and more expensive relay in applications that require switching of large load currents.

14 Claims, 2 Drawing Sheets

(56) References Cited

U.S. PATENT DOCUMENTS

| | | |
|---|---|---|
| 7,612,471 B2 | 11/2009 | Schasfoort |
| 7,643,256 B2 | 1/2010 | Wright et al. |
| 8,432,650 B2 | 4/2013 | Seger |
| 8,482,885 B2 | 7/2013 | Billingsley et al. |
| 8,619,395 B2 | 12/2013 | Henke |
| 8,928,184 B2 | 1/2015 | Ganesan |
| 2011/0102052 A1 | 5/2011 | Billingsley et al. |
| 2014/0217814 A1* | 8/2014 | Namou ................... B60L 11/00 307/10.1 |
| 2015/0015322 A1 | 1/2015 | Potter et al. |

* cited by examiner

PARALLELING MECHANICAL RELAYS FOR INCREASED CURRENT CARRYING AND SWITCHING CAPACITY

FIELD OF THE DISCLOSURE

The subject matter of the present disclosure generally relates to systems and methods for enabling two or more mechanical relays to be used in parallel to increase their total current switching capability, while at the same time, eliminating arcing and switching-related failure of the relay contacts.

BACKGROUND OF THE DISCLOSURE

For many applications, relays, especially old-fashioned electromechanical relays, are the simplest and most reliable way to switch currents to load. This is particularly true for situations where the load currents may be high, e.g., in excess of 20 amperes.

However, the cost, size and weight of electromechanical relays increases significantly as their current carrying capacity goes up. In many circuit configurations where cost and/or size and/or weight is a consideration, it would be desirous to replace a single large high current capacity relay with two or more smaller relays in parallel, each of which has a current capacity below that required by the circuit application, but whose combination provides the desired capacity.

While this at first appears to be a simple matter, the use of parallel relays to increase the overall load current capacity of a circuit is not recommended by relay manufacturers, because such parallel relay configurations often lead to premature relay failure.

The key failure mechanism that occurs when two or more relays are connected in parallel arises from time differences that occur between the opening and closing of the contacts in such parallel-configured relay assemblies. When one attempts to operate two or more relays in parallel in place of a single larger relay, inherent manufacturing tolerances will invariably cause one of the relays to open or close at a slightly different time as compared to the other relay(s).

As a consequence, when the relays in a parallel relay assembly are switched to close, the relay that closes first will momentarily have to pass a load current that is significantly above its rated current carrying capacity, until the other relay (or relays) close. Likewise, when the relay assembly is switched open, the relay that opens last will also exceed its current carrying capacity, after the other relays have dropped out. Repeated overcurrent of the relay contacts during these transient switching time periods ultimately leads to their premature failure.

In accordance with the embodiments taught herein, such failure mechanism is avoided by incorporating one or more semiconductor devices that commutate the current through the arrangement of parallel relays during the times when their contacts or opening and closing, to avoid over current and attendant arcing from damaging the contacts.

By arranging for the bulk of the switching current to pass through one or more semiconductor devices during turn-on or turn-off of the parallel relays, rather than through their relay contacts, the contacts will carry an insignificant current during the switching operation. This eliminates the possibility of a single relay carrying more than it's rated current at any time.

By way of further background, when using electromechanical relays, care must also be taken to avoid or reduce problems arising from contact bounce, arcing and other deleterious transient effects that often occur during the making and breaking of the relay's mechanical contacts. Such effects are particularly problematic when switching highly inductive loads. These transient effects, if not properly addressed, will result in contact pitting, erosion, welding and ultimately in relay failure.

To reduce such problems caused by switching transients, it has been known in the art to incorporate, for example, an RC snubber circuit or a solid state switch in parallel with an electromechanical relay. Such snubber/switch arrangements generally may act to suppress destructive transients and prolong the life of the electromechanical contacts by providing an alternative path for current to flow during the make and break of the relay's contacts.

Prior art examples showing the parallel combination of an electromechanical relay with a solid state switch may be found in, for example, U.S. Pat. Nos. 3,639,808, 5,699,218, 8,482,885, among others.

However, the prior art only teaches use of a solid state switch to prolong the life of a single mechanical relay. Significantly, it has heretofore not been recognized that the use of solid state switches can also overcome the aforementioned problems inherent in using parallel combinations of electromechanical relays in place of a single larger electromechanical relay. As a consequence, it is still standard practice to avoid combining multiple relays in parallel, because of the problems discussed above.

Accordingly, a first advantage of the disclosed embodiments is to enable use of multiple smaller relays in parallel to switch currents that would otherwise require use of a larger, bulkier and more expensive single relay.

The embodiments disclosed herein also substantially eliminate arcing between contacts during the switching process, thereby causing little or no contact degradation during the operation of the relays. This results in extended relay life.

Further, since the semiconductor device only carries current for a short time corresponding to the transient time period during which the relay contacts are being switch from their fully closed to fully open states, a relatively small and inexpensive semiconductor device may be used.

Still further, since the parallel relays carry all of the current during normal operation, the semiconductor device will dissipate virtually no heat, obviating the need for large heat sinks.

Finally, a further advantage of the systems and methods disclosed herein is that arcing caused by mechanical vibration of the relay contacts, which may also result in premature failure, is also substantially eliminated.

BRIEF DESCRIPTION OF THE DRAWINGS

The foregoing aspects, and other advantages and benefits of the embodiments and circuit arrangements disclosed herein will become apparent from the following more detailed description, which may be understood with reference to the attached drawings, in which.

DETAILED DESCRIPTION

Figure 1:
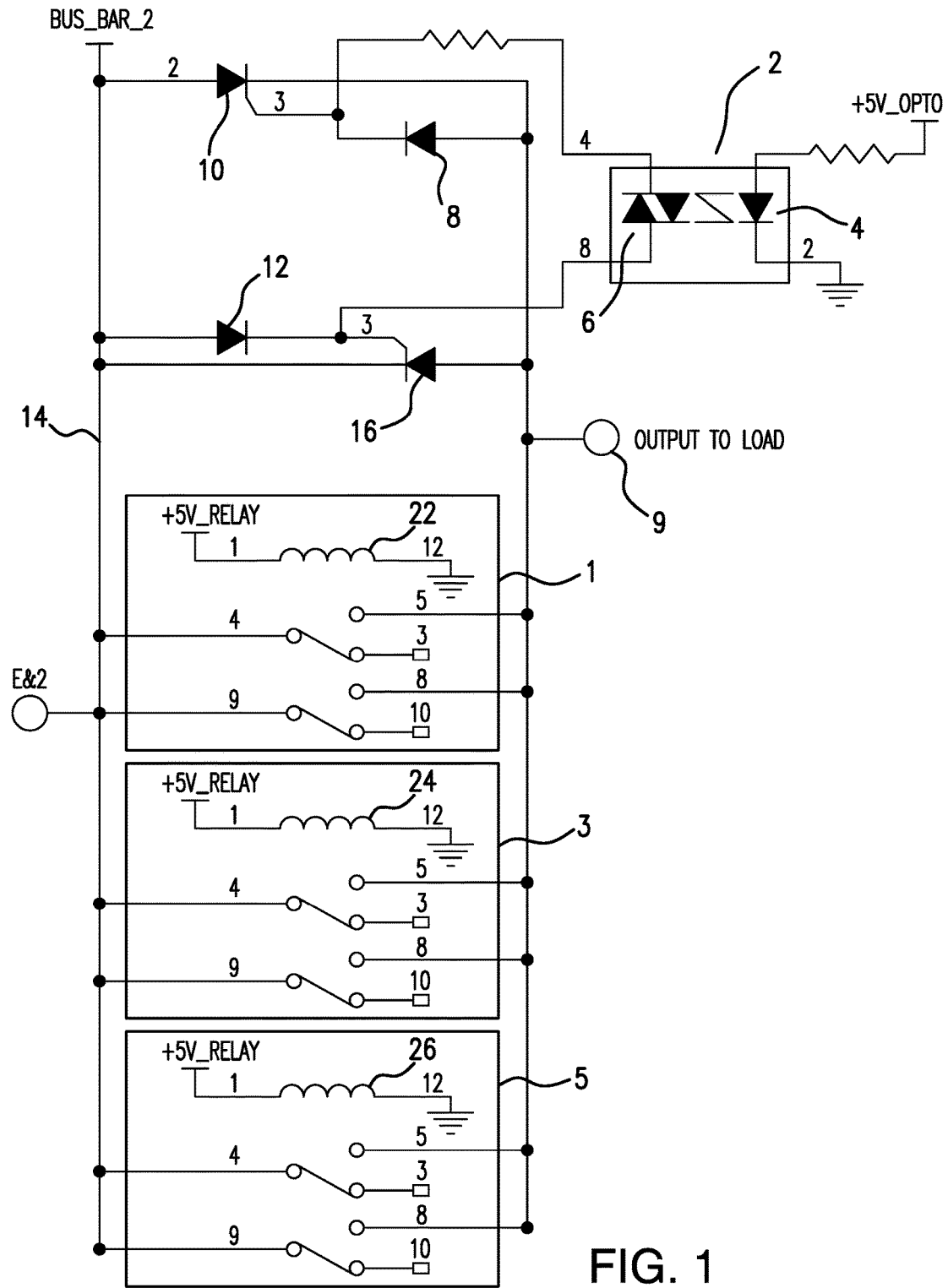
FIG. 1 is a schematic diagram of an embodiment showing a parallel combination of three relays, combined with a solid state SCR switch assembly.

An exemplary embodiment of the disclosed invention is shown in FIG. 1. Referring thereto, relays 1, 3 and 5 are connected in parallel and used to switch an AC load current from line 14 to a load (not shown) connected to output 9. Relays 1, 3 and 5 include respective coils 22, 24, and 26 that are each energized to close their respective contacts upon application of a voltage, thereby connecting line 14 to output terminal 9.

As further shown in FIG. 1, a semiconductor switch assembly is electrically connected across the parallel combination of relays 1, 3, and 5. In this particular embodiment, the semiconductor switch assembly includes two silicon controlled rectifiers (SCRs) 10 and 12. Other examples of semiconductor switches that may be used to implement the disclosed invention include, by way of example, field effect transistors (FETs), insulated gate bipolar transistors (IGBTs) and bipolar junction transistors (BJTs), which can be used for AC or DC devices, among other switches.

Referring further to the right-hand side of FIG. 1, an optically isolated triac driver 2 is provided for controlling the state of the SCRs. As shown, triac driver 2 includes a light emitting diode 4 and a light-activated bilateral switch in the form of a triac which closes when illuminated by diode 4. As shown, light emitting diode 4 is turned on by 5 volts supplied from a power supply (not shown). Activation of light emitting diode 4 closes the bilateral switch 6, while at the same time providing optical isolation.

Depending upon the polarity of the AC voltage on line 14, closure of bilateral triac switch 6 causes a gate trigger voltage to be applied to switch on either SCR 10 or 16, as the case may be, through respective diodes 12 or 8.

In the embodiment shown in FIG. 1, a 5 volt energizing voltage is also applied across relay coils 22, 24 and 26 to close the respective relay contacts of relays 1, 3 and 5.

In operation of the FIG. 1 embodiment, closure of the SCR switches occurs before closure of the relay contacts. Thus, as the relay contacts start to close, the bulk of the load current momentarily passes through SCRs 10, 12 and not through the relay contacts, because of the low on-resistance of the SCRs. As the relay contacts continue to close, their resistance drops and more and more of the current is shunted through the relay contacts.

The relay contacts, when fully closed, ultimately short out the SCRs, causing the voltage across the SCRs to drop below their minimum turn-on voltage. At this point, the SCRs will turn off, even though bilateral switch 6 is still closed and is still applying trigger voltage to the gates of the SCRs 10, 12, so that the SCRs do not dissipate any power.

Comparably, when the relay contacts start to open, the resistance across their respective contacts will start to increase, and at some point in time the voltage drop across the SCRs will become high enough for them to be turn back on. As the relay contacts continue to open, the current will be shunted more and more from the relay contacts through to the SCRs. This shunting action optimally occurs before the voltage across the relay contacts becomes high enough to sustain an arc.

Based on the foregoing description of the operation of the FIG. 1 circuit, even though the relay contacts in relays 1, 3, and 5 do not open or close at exactly the same time, the SCRs provide a shunt path for the load current during the transient time periods when the contacts are being switched, so that relays 1, 3, and 5 are not overstressed and arcing is inhibited during both the closing and opening transitions of their relay contacts.

As should now be evident from the foregoing description, the exemplary arrangement shown in FIG. 1 permits multiple smaller relays to be connected in a parallel configuration to share and switch a combined load current that would otherwise require a larger, bulkier and more expensive single relay, while avoiding the failure mechanisms previously associated with the use of such parallel relay arrangements.

The foregoing implementation of a parallel relay arrangement, and variations thereto, has numerous applications in situations where it would be advantageous, either from a cost, size or weight perspective, to replace a single large relay with two or more smaller relays.

By way of example, one application for a parallel relay arrangement may be found in US Patent Publication 2015/00923095, corresponding to U.S. patent application Ser. No. 14/044,303 assigned to Astronics Advanced Electronic Systems Corp., the contents of which are fully incorporated herein by reference. This Patent Publication discloses a microprocessor-based "virtual" circuit breaker that can replace a more conventional thermal circuit breaker/power relay combination typically used in power distribution systems.

For example, in power distribution systems designed for aerospace applications, there is a significant cost and space advantage if the power relay, which has to handle currents in the range of 20 amperes, can be replaced by a parallel array of smaller relays that still provide the same current handling capacity, as per the present disclosure.

Figure 2:
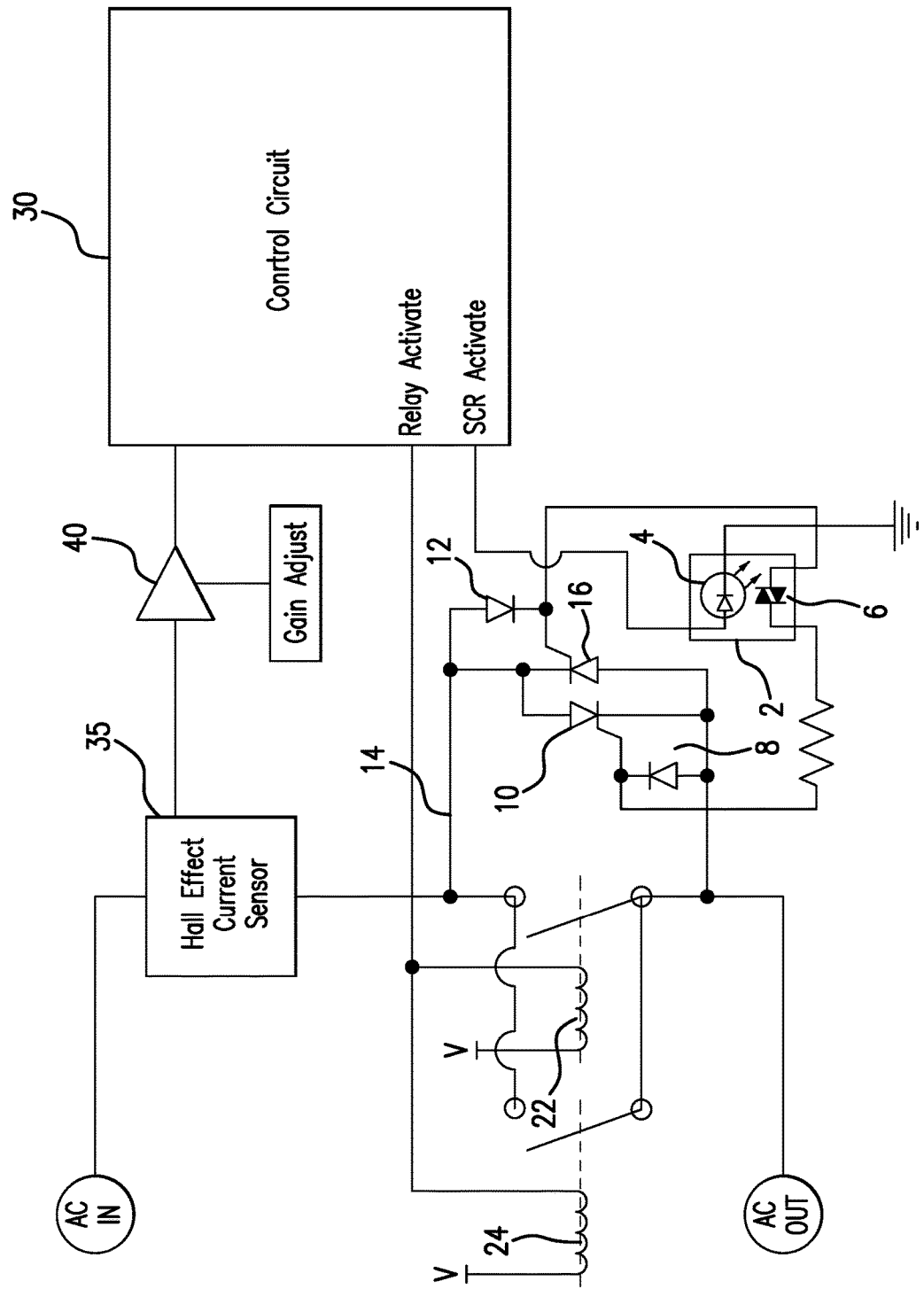
FIG. 2 is a schematic diagram showing the circuit arrangement of FIG. 1, as used in an electronic circuit breaker implementation.

In pertinent part, and by way of example, a relevant implementation that could be used as part of the virtual circuit breaker disclosed in the aforementioned Patent Publication is shown in FIG. 2, in which the same numerals used in FIG. 1 identify like components in FIG. 2.

In the FIG. 2 implementation, a microprocessor-based control circuit 30 monitors the AC current being provided to a load (not shown) through an arrangement of two or more relays connected in parallel. As shown in FIG. 2, the AC current being drawn by the load is measured by a Hall Effect current sensor 35 whose output is provided to control circuit 30 through a gain adjusting amplifier 40.

Control circuit 30 provides a "relay activate" signal that permits the respective relay coils 22, 24, . . . to be energized to close the contacts in the parallel relay arrangement. As further shown in FIG. 2, control circuit 30 also provides an "SCR activate" signal that turns on optically isolated triac 2 to cause gate trigger voltages to be applied to the gates of SCR switches 10, 16.

In operation, and in accordance with the foregoing descriptions, the "SCR activate" signal is output before the "relay activate" signal is output. Likewise, the "SCR activate" signal is removed after the "relay activate" signal is removed. This ensures that the SCRs will be gated and ready to turn on to appropriately shunt current during the transient time period during which the relay contacts are closing and opening.

In this FIG. 2 embodiment for a virtual circuit breaker, the "relay activate" signal would be removed in response to the control circuit 30 detecting an over current or short condition, based upon the input value received from current sensor 35.

While the disclosed embodiments will find application in many different end uses that will be apparent to a worker of ordinary skill upon reading this disclosure, these embodiments are particularly beneficial in applications involving the switching of large currents, for example in power distribution systems that use expensive and bulky relays.

Further, although the disclosed subject matter has been described and illustrated with respect to the exemplary embodiments provided herein, it will be understood by those of ordinary skill in the art that various additions and modifications may be made to these disclosed embodiments without departing from the spirit and scope of the innovations disclosed herein, as set forth in the following claims.

What is claimed:

1. A relay system for switching current to a load comprising:
   a plurality of relays arranged in an electrically parallel configuration, each relay sized to carry a portion of the current to the load; and
   a semiconductor switch assembly connected across the plurality of relays configured to
   in a first mode, activate the semiconductor switch assembly before the plurality of relays such that an amount current sufficient to prevent arcing in the plurality of relays passes through the semiconductor switch assembly by virtue of a low on-resistance of the semiconductor switch assembly relative to a resistance of the relays, and
   in a second mode, activate the semiconductor switch assembly as the current across the plurality of relays increases such that the current is shunted through the semiconductor switch assembly until the plurality of relays are fully open.

2. The relay system of claim 1, wherein said semiconductor switch assembly comprises one or more silicon-controlled rectifiers.

3. The relay system of claim 1, wherein said semiconductor switch assembly comprises one or more field effect transistors.

4. The relay system of claim 1, wherein the semiconductor switch comprises one or more insulated gate bipolar transistors.

5. The relay system of claim 1, wherein said semiconductor switch assembly comprises one or more bipolar junction transistors.

6. The relay system of claim 2, further comprising drive circuitry for providing gate trigger voltages to turn on the one or more silicon-controlled rectifiers.

7. The relay system of claim 6, wherein the drive circuitry includes a bilateral switch.

8. The relay system of claim 7, wherein the bilateral switch is light activated.

9. The relay system of claim 8, wherein the bilateral switch is triac.

10. The relay system of claim 7, wherein the bilateral switch provides optical isolation.

11. A virtual circuit breaker comprising:
    a plurality of relays arranged in an electrically parallel configuration, each relay sized to carry a portion of current to a load;
    a semiconductor switch assembly connected across the plurality of relays;
    a control circuit for monitoring current to said load and opening said relay contacts when an over current or short circuit condition is sensed; and
    wherein the semiconductor switch assembly is configured to, in a first mode, activate the semiconductor switch assembly before the plurality of relays such that an amount current sufficient to prevent arcing in the plurality of relays passes through the semiconductor switch assembly by virtue of a low on-resistance of the semiconductor switch assembly relative to a resistance of the relays, and
    in a second mode, activate the semiconductor switch assembly as the current across the plurality of relays increases such that the current is shunted through the semiconductor switch assembly until the plurality of relays are fully open.

12. The virtual circuit breaker of claim 11, wherein said semiconductor switch assembly is configured to shunt excess current away from each of the plurality of relays during said transient time period.

13. The virtual circuit breaker of claim 12, wherein said semiconductor switch assembly comprises one or more silicon-controlled rectifiers that are triggered on to shunt said excess current during said transient time period.

14. A method for reducing contact failure when a plurality of relays, each having one or more contacts, are arranged in an electrically parallel configuration to switch current to a load, comprising the steps of:
    connecting a semiconductor switch assembly across said plurality of relays, and
    in a first mode, activating the semiconductor switch assembly before the plurality of relays such that an amount current sufficient to prevent arcing in the plurality of relays passes through the semiconductor switch assembly by virtue of a low on-resistance of the semiconductor switch assembly relative to a resistance of the relays; and
    in a second mode, activating the semiconductor switch assembly as the current across the plurality of relays increases such that the current is shunted through the semiconductor switch assembly until the plurality of relays are fully open.

* * * * *